Sept. 2, 1958 H. E. ENGLESON ET AL 2,850,144
CONVEYING, PACKAGING AND SLITTING MACHINE
Original Filed Aug. 9, 1954 3 Sheets-Sheet 1
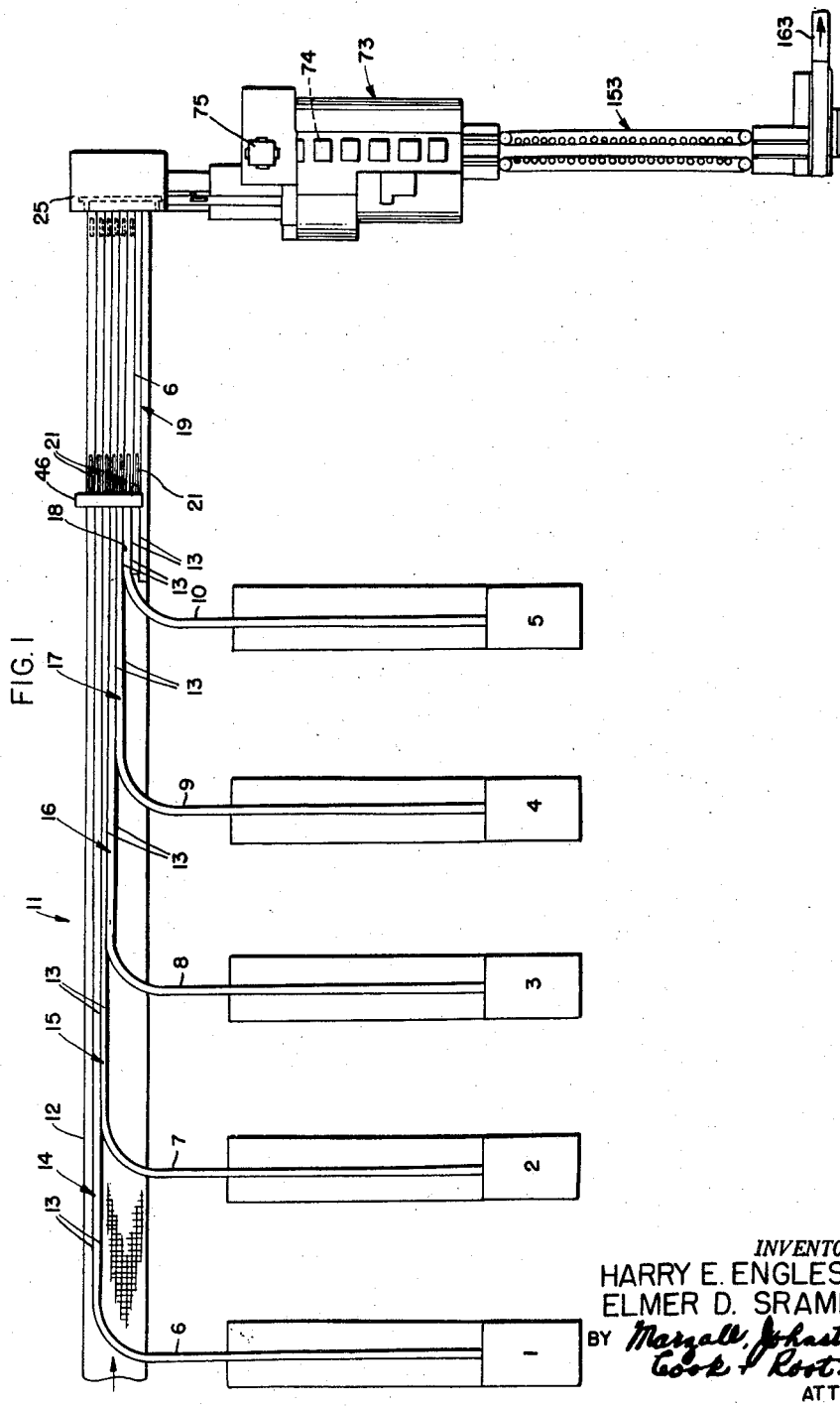
INVENTORS:
HARRY E. ENGLESON
ELMER D. SRAMEK
BY Marshall, Johnston,
Cook & Root.
ATT'YS

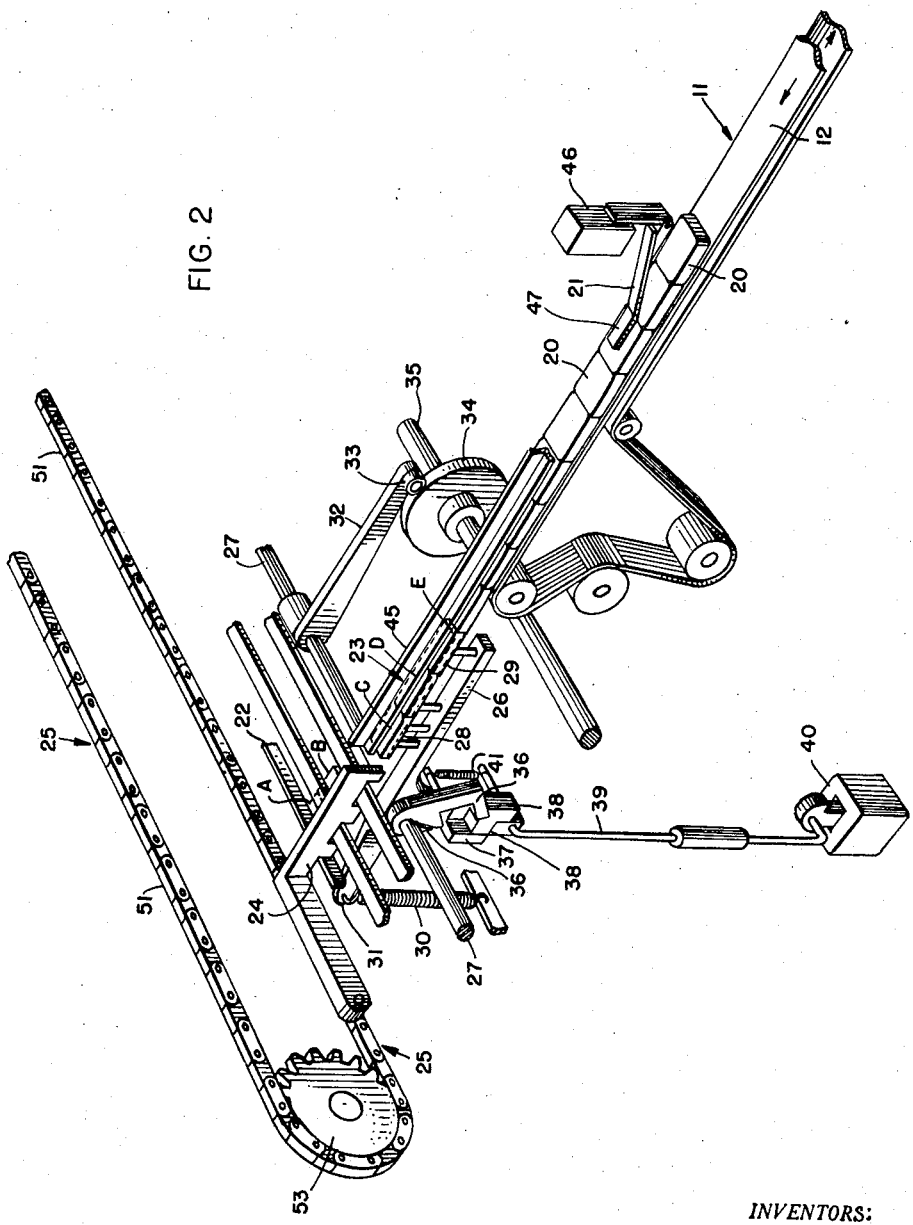

Sept. 2, 1958  H. E. ENGLESON ET AL  2,850,144
CONVEYING, PACKAGING AND SLITTING MACHINE
Original Filed Aug. 9, 1954  3 Sheets-Sheet 3
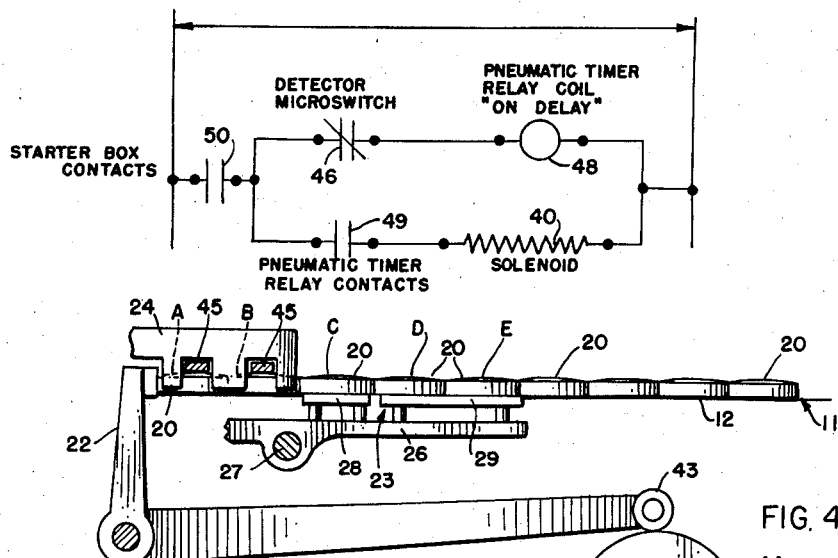
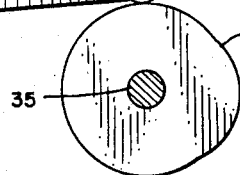
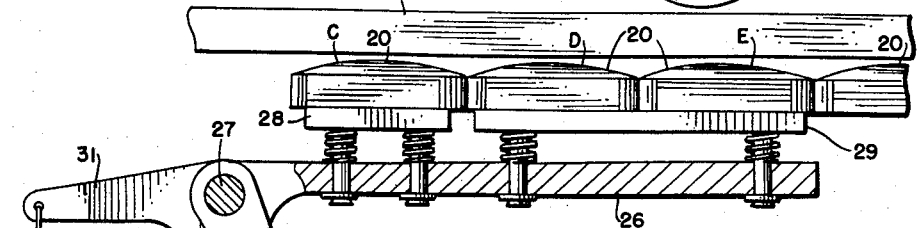
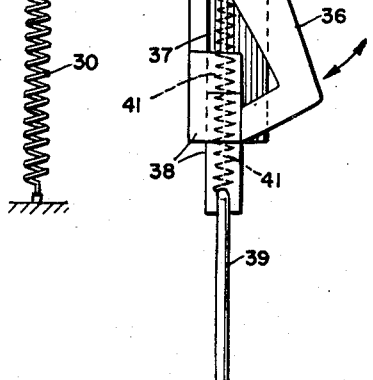
INVENTORS:
HARRY E. ENGLESON
ELMER D. SRAMEK
BY
ATT'YS

United States Patent Office 2,850,144
Patented Sept. 2, 1958

2,850,144

CONVEYING, PACKAGING AND SLITTING MACHINE

Harry E. Engleson, Chicago, and Elmer D. Sramek, Cicero, Ill., assignors to F. B. Redington Co., Chicago, Ill., a corporation of Delaware Original application August 9, 1954, Serial No. 448,607. Divided and this application August 13, 1956, Serial No. 603,742

7 Claims. (Cl. 198—34)

This invention relates to mechanism for conveying articles in a predetermined sequence to predetermined positions, and more particularly to arrangements for mechanically detecting and intermittently clamping the articles conveyed, the present application being a division of the copending application for United States Letters Patent for a Conveying, Packaging and Slitting Machine, Serial No. 448,607, filed August 9, 1954.

The machine of the present invention consists in mechanism for delivering articles, such as small metal containers normally referred to as "tins," the tins being delivered from tin packaging machines, which latter machines are normally referred to as "tin packers." Tins are delivered by means of conveyors to respective channels where they are conveyed by a main line-conveyer to a converger conveyer, where the tins are shifted at right angles from the main line-conveyer. The tins along the main line-conveyer are intermittently arrested or clamped by certain clamping mechanism, the operation of which is controlled by certain detectors. A penumatic delay mechanism permits a plurality of tins from each line or channel to be first clamped, and then released at the proper time interval for delivery to the converger conveyer. The converger conveyer and a cartoning mechanism into which the tins will feed are described in the copending application of the present inventors entitled "Conveying, Packaging and Slitting Machine," Serial No. 448,607, filed August 9, 1954, from which this application was divided.

An important object of the invention consists in the provision of means for periodically clamping lines or rows of tins and periodically releasing such tins to a conveyor converger.

Another object consists in the arrangement of a pneumatic delay system cooperating with detector mechanism to intermittently clamp articles and then release the articles after a certain time delay so long as there are articles in line being fed, and which causes the articles to be clamped indefinitely when there is an insufficient number of tins in a line.

Numerous other objects and advantages will be apparent throughout the progress of the specification which follows.

The accompanying drawings illustrate a certain selected embodiment of the invention, and the views therein are as follows:

Fig. 1 is a detail top plan view somewhat diagrammatic or schematic in nature and showing the various parts of the machine;

Fig. 2 is a detail perspective view of certain mechanism, including the detector mechanism, the converger mechanism, and tin clamping mechanism for clamping tins prior to release to the converger conveyer;

Fig. 3 is an electric diagram disclosing the operation of certain of the elements shown in Fig. 2;

Fig. 4 is a detail elevational view, partly in section, showing certain of the mechanism, and the manner in which the tin stop is operated; and Fig. 5 is a detail elevational view, partly in section, showing some of the clamp control mechanism adapted to be operated by a solenoid.

The particular construction herein shown for the purpose of illustrating the present invention comprises a plurality of filling machines, termed "tin packers" for packaging or packing a plurality of tablets in small flat metal boxes, referred to herein, and known in the art as "tins." These tins may be of any convenient or desired shape or size, and each receives a certain predetermined number of tablets. The type and size of tins employed in the present embodiment are relatively small and shallow, and are designed to receive a dozen tablets, the tins being relatively rectangular in shape with a closed top which is hinged along one side. Five tin packers, or filling machines, are specifically disclosed, being numbered 1 to 5, inclusive, Fig. 1. A greater or lesser number of tin filling machines may be used, depending upon the requirements and the production to be handled.

Each tin packer delivers tins, in a row, to a separate delivery for movement to a main line-conveyer. Tins from the tin packers 1 to 5, Fig. 1, are discharged onto their separate deliveries 6 to 10, respectively, each delivery having side guides. The tins from each delivery 6 to 10 are received onto a main line-conveyer 11 which may be in the form of an endless relatively wide belt 12. Guide strips 13, arranged over the belt 12, divide the belt or conveyer 12 into separate guide ways or channels 14 to 18 which are angularly disposed relative to the deliveries 6 to 10, whereby rows of tins are moved in rows along the channels 14 to 18, respectively, Fig. 1. Tins from the packers 1 to 5, inclusive, therefore, are delivered to the belt 12 in rows and are conveyed along the channels between the guides 13, in continuous moving rows for delivery, gathering, packaging and conveying purposes. Five tin packers or filling machines for the five channels are specifically shown, but more or less machines and channels may be employed, depending on the circumstances and upon the conditions required. There are preferably one or more additional channels provided to permit extra tins to be fed by hand, one such extra channel 19 being shown in Fig. 1.

Tins 20, which are filled by the previously mentioned tin packers 1 to 5, are fed by the conveyer 11 (belt 12) along a predetermined path, first passing under detectors 21, there being one detector for each channel. There are five machines, 1 to 5, five delivery channels, 6 to 10, for the five rows of tins 20, and five detectors 21. Thus, there is one detector for each channel or row of tins. An extra detector 21 is provided also for the channel or row 19. As the tins for each row are conveyed in the same manner, and each detector 21 operates in the same manner as the others, only the manner of feed, and the manner of operation of one detector for one row, will be described.

Tins 20 are delivered from a tin packer and supported on the belt 12, Figs. 1 and 2, moving from right to left, Fig. 2, where they are adapted to engage an operated stop 22. Mechanical spring clamps, designated generally by the number 23, close to clamp a third tin 20 as indicated at C, Fig. 2, the first tins 20 being designated as A and B, respectively. The stop 22 operates to release tins A and B to the left, Fig. 2, a short distance, thus permitting a conveyor converger lug 24, on a converger conveyer 25, to move two tins to the left onto a converger delivery belt.

A tin clamp lever 26, supporting each of the clamps 23, is freely mounted on a rocker shaft 27, Fig. 2, which is rotatively mounted in bearings in a part of the machine, or machine framework. Each clamp lever 26 carries a clamp 23, each of which has two spring plates 28 and 29. The left hand spring plate 28 clamps tin C, and the right hand spring plate 29 clamps two tins 20 designated as D and E, Figs. 2, 4 and 5. The clamp lever 26 is held up in clamp position by a spring 30 which has one end fastened to a tail piece 31 on the freely mounted lever 26, and its other end secured to a stationary part of the machine frame.

A cam lever 32, Fig. 2, is fixed to the shaft 27, which gives the shaft 27 its oscillating motion. A cam roller 33, on the lever 32, engages a cam 34 fixed on a rotating shaft 35 which is journaled in bearings in the machine frame. Rotation of the shaft 35, therefore, imparts oscillatory motion to the shaft 27 by the cam lever 32.

A clamp operator lever 36, Fig. 2, is also pinned to the shaft 27 and is also oscillated thereby. A clamp operator plate 37 is fastened to the left hand side of the clamp lever 26. Between the clamp lever 26 and the plate 37 there is a clamp engaging block 38, which is held in down position by a link 39 operated by a solenoid 40. A spring 41, between the clamp lever 26 and the upper end of the link 39, holds the clamp engaging block 38 above the clamp operator lever 36 when the solenoid 40 is de-energized. The clamp operator lever 36 operates the clamp lever 26 down to unclamp tins. Tins 20 (C, D and E) are clamped while the converger lug 24 moves tins A and B to the right; and tins are unclamped to permit tins to feed up against the operated stop 22.

The operated stop 22, Fig. 4, comprises a lever arm 42 having a cam roller 43. The cam roller 43 engages a cam 44 which is fixed to the rotary shaft 35. The operated stop 22, therefore, operates in proper timed synchronous relation with the tin clamps 28 and 29. The clamping operation of the clamp lever 26, and the spring clamps 28 and 29, is normally upward, being pulled in that direction by the spring 30, whereby the tins are clamped between the clamps 28 and 29 and top guides 45, 45, Figs. 2 and 5.

When there is a supply of tins available, a detector 21 will be held up by the tins 20 on the belt 12, the detector 21 being held away from a normally closed microswitch 46, Fig. 2, which energizes the solenoid 40. The energized solenoid pulls the clamp engaging block 38 between the clamp operator lever 36 and the clamp operator plate 37, the clamp operator lever 36 thus releasing two tins 20 (A and B) each revolution of the cam 34.

Whenever there is a failure of supply of tins 20, the detector 21 will drop and cause the normally closed microswitch 46, Fig. 2, to open, thereby de-energizing the solenoid 40 and permitting the spring 41, Fig. 2, between the clamp lever 26 and the clamp engaging block 38, to pull the clamp engaging block 38 above the operator lever 36. The clamp operator lever 36 operates during each revolution of the cam 34, but since the thickness of the clamp engaging block 38 is slightly greater than the stroke of the clamp operator lever 36, the tin clamp lever 26 continues to clamp tins in timed position until the supply of tins is again available to hold up the detector. The end of the solenoid link 39 may be bent and extended through the block 38 to receive one end of the spring 41, the other end of the spring being secured to a pin on the clamp lever 26, Fig. 2.

Tins 20, therefore, are always released in time, being controlled by the clamp operator lever 36 which is timed by the cam 34. Should a detector drop because no tin is thereunder, and the solenoid 40 be de-energized during the clamp release part of the stroke, that part of the surface of the clamp operator lever 36 which contacts the clamp engaging block 38, being tapered, Fig. 5, will frictionally hold the block 38 against the plate 37 against the biasing of the spring 41 and thereby preclude withdrawal of the block 38 from the path of the tapered part of the lever 36 until the release stroke has been completed and the lever 36 has returned to its normal position.

The electrical circuit, Fig. 3, functions so that when a supply of tins is available an arm 47 of the detector 21, Fig. 2, is lifted, permitting the normally closed microswitch 46 to close and energize the relay coil of a pneumatic timer 48 "on delay." Time delay takes place during this action. This "on delay" closing of contact points 49 in the pneumatic timer 48 is to prevent the feeding out of all tins. Should one tin come along on the belt at a time to energize the solenoid 40, and two tins 20 be allowed to feed into the converger conveyer lug 24, there would be one tin less than what was had at the start. Should this latter situation occur a sufficient number of times, all tins would run out. With the open type "on delay" pneumatic timer 48, should one tin come along at a certain time, the contact points would not be closed immediately, but instead would be closed after the proper time delay if the arm 47 of the detector 21 is held up by succeeding tins. The pneumatic timer relay contact points 49 close to energize the solenoid 40. When the supply of tins fails, and the detector arm 47 drops to open the normally closed microswitch 46, the relay coil of the pneumatic timer 48 is de-energized, and the circuit to the solenoid 40 is broken immediately.

Contact points 50, Fig. 3, in a converger motor starter box (not shown) are to close the circuit of a converger intake tin clamp detector 21 and an escapement for the conveyer only when converger 25 is running. This arrangement is to protect the solenoid 40 from burning out if converger 25 should stop at a time when the plunger of the solenoid could not seat itself.

The first two tins 20 (A and B), after being released from the stop 22, are picked up, two deep, by the spaced lugs 24 of the converger conveyer 25, from each of the channels or guideways 14 to 19, inclusive. The lugs 24 are fastened to a chain 51, Fig. 2, and are spaced apart a distance somewhat more than the number of lines or channels being employed. The chain 51 is trained over a spaced sprocket 53. Thus, the tins 20 are moved by the converger conveyor 25, Fig. 2, to a cartoner 73, Fig. 1, where the tins are placed in cartons 74 from a stack 75. In subsequent operations the cartons are sealed with glue and move through a drying channel 153, and thence move from the packaging machine on a delivery belt 163. A more complete description of the cartoner 73, the drying channel 153 and the delivery conveyer 163 may be found in the copending application, Serial No. 448,607, of which the present application is a division.

The machine of the invention provides new and novel means for clamping oncoming tins for a predetermined interval of time, and causes tins to be fed to the cartoner to be packaged into a carton by the filler pushers. In the event of failure of a supply of tins being fed to the converger conveyer, the rows of tins will be held up. In the event of failure of the mechanism, caused by jamming of tins enroute to packaging position, the cartoner will stop, at which time the escapement door will open, and thereby prevent the piling up of tins.

The structure of the invention is positive and efficient in operation, and permits several rows of tins to be positioned in several layers within a carton.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A machine of the class described comprising a continuously moving conveyer carrying articles arranged in a row in contacting relation, a detector under which the articles pass, switch means operated by the detector, clamping means responsive to said detector to clamp certain of said articles when articles pass under the detector, means to hold said clamping means in clamping position for a certain time interval, means to release the clamping action after said time interval, and means for holding said clamping means in clamped position when the detector detects no articles under said detector because of a failure of a supply of articles.

2. A machine of the class described comprising a continuously moving conveyer carrying articles arranged in a row in contacting relation, a detector under which the articles pass, switch means operated by the detector, clamping means responsive to said detector to clamp certain of said articles when articles pass under the detector, means to hold said clamping means in clamping position for a certain time interval, means to release the clamping action after said time interval, and means for holding said clamping means in clamped position when the detector detects no articles under said detector because of a failure of a supply of articles, said second named means comprising a pneumatic time delay control member, and said last named means including a solenoid controlled by said switch means.

3. In a packaging machine having a conveyer for transporting articles, apparatus for intermittently clamping and releasing the articles when a sufficient number of the articles appears on the conveyer and for continuously clamping and holding the articles when a deficiency of articles appears on the conveyer, said apparatus comprising clamp means mounted to move into engagement with the articles on the conveyer, a detector means operatively associated with the conveyer of sensing the presence of articles on the conveyer, a continuously reciprocating drive means, and coupling means operatively associated with the clamp means and with the drive means for drivingly coupling the clamp means to the drive means, said coupling means being responsive to said detector means whereby the clamp means is drivingly coupled to the reciprocating drive means only when the detector senses the presence of articles on the conveyer and whereby the clamp means remains in an article holding position when the detector means fails to sense articles on the conveyer.

4. In a packaging machine having a conveyer for transporting articles in a line, apparatus for intermittently clamping and releasing groups of the articles when a sufficient number of the articles appears in the line following the articles being clamped and for continuously clamping and holding the articles when a deficiency of articles follows the articles being clamped, said apparatus comprising a clamping means operatively associated with the conveyer and movable into engagement with the articles thereon, a detector means mounted over the conveyer, said detector means having an arm positioned to contact articles following the article at the clamp means, a continuously rotating cam, an oscillatory member engaging the cam and being continuously oscillated thereby, a coupling means drivingly coupled between the oscillatory member and the clamp means for causing the clamp means to alternately clamp and release the articles on the conveyer as the cam rotates, and a disabling means operatively associated with the coupling means, said disabling means being responsively coupled to the detector means whereby the clamp means remains in a clamped position when a deficiency of articles appears in the conveyer.

5. Apparatus according to claim 4 wherein the detector means includes an electric switch operated by movement of the arm, wherein the disabling means includes a solenoid electrically coupled to the electric switch, and wherein the coupling means includes a member normally engaged with the oscillatory member, said solenoid being mechanically coupled to the member and being operative to move the member out of engagement with the oscillatory member thereby uncoupling the drive means from the clamp means.

6. In a machine having a conveyor for transporting articles and for passing the articles in synchronism with a subsequent conveying means, apparatus for intermittently clamping and releasing the articles when an adequate supply of articles is following the articles being clamped and for continuously clamping the articles when an insufficient supply of articles follows the articles being clamped, said apparatus comprising a clamp means operatively associated with the conveyor for clamping and holding groups of articles thereon, a continuously rotating drive means coupled to rotate synchronously with movement of the subsequent conveyor, said drive means including a cam, a rock member engaged with and continuously oscillated by the cam, a clamp oscillating means drivingly coupled between the rock member and the clamp means whereby the clamp means is caused to intermittently release the articles in synchronism with the drive means and with the subsequent conveying means, a detector means having an arm positioned to contact articles on the conveyor subsequent to the articles at the clamp means, said detector means being operative to sense the presence of a sufficient number of articles subsequent to the clamping means, and a clamp release disabling means operatively associated with the clamp oscillating means and responsively coupled to the detector means, said clamp release disabling means being operable to uncouple the clamp oscillating means from the rock member when an insufficient number of articles is sensed by the detector means, said clamp release disabling means and said clamp oscillating member being further operable to cause the clamp means to release articles synchronously with the subsequent conveying means when a sufficient number of articles is sensed by the detector means.

7. A machine of the class described comprising a continuously moving conveyor carrying articles arranged in a row in contacting relation, a detector mounted above said conveyer under which articles pass, switch means operated by the detector in the absence of articles, clamping means at the end of said conveyor to intermittently clamp certain of said articles and stop their advancement when articles pass under the detector in a substantially continuous stream, actuating means to normally hold said clamping means in clamping position for a certain time interval and normally release said clamping means for a certain time interval, and a means responsive to said switch means for rendering said actuating means non-operative whereby the clamping means will remain in clamping position and stop movement of the articles.

References Cited in the file of this patent
UNITED STATES PATENTS

| | | |
|---|---|---|
| 1,980,411 | Kimball | Nov. 13, 1934 |
| 2,491,651 | Everett | Dec. 20, 1949 |
| 2,728,177 | Holstebroe | Dec. 27, 1955 |